US012653207B2

(12) United States Patent
Bernaert et al.

(10) Patent No.: US 12,653,207 B2
(45) Date of Patent: Jun. 16, 2026

(54) CACAO POD HUSK POWDER, METHOD OF ITS PREPARATION AND ITS USE IN FOOD, PHARMACEUTICAL AND COSMETIC COMPOSITIONS

(71) Applicant: Cabosse Naturals NV, Halle (BE)

(72) Inventors: Herwig Bernaert, Halle (BE); Gabi Kopp, Munich (DE)

(73) Assignee: Cabosse Naturals NV, Halle (BE)

( * ) Notice: Subject to any disclaimer, the term of this patent is extended or adjusted under 35 U.S.C. 154(b) by 260 days.

(21) Appl. No.: 17/268,686

(22) PCT Filed: Aug. 19, 2019

(86) PCT No.: PCT/EP2019/072187
§ 371 (c)(1),
(2) Date: Feb. 16, 2021

(87) PCT Pub. No.: WO2020/038906
PCT Pub. Date: Feb. 27, 2020

(65) Prior Publication Data
US 2022/0256881 A1      Aug. 18, 2022

(30) Foreign Application Priority Data
Aug. 20, 2018      (EP) ..................................... 18189813

(51) Int. Cl.
A23G 1/50          (2006.01)
A23G 1/00          (2025.01)
A23G 3/34          (2006.01)

(52) U.S. Cl.
CPC ............. *A23G 1/50* (2013.01); *A23G 1/0003* (2013.01); *A23G 1/0016* (2013.01); *A23G 3/0002* (2013.01)

(58) Field of Classification Search
CPC ...... A23G 1/50; A23G 1/0003; A23G 1/0006; A23G 1/0009
See application file for complete search history.

(56) References Cited

U.S. PATENT DOCUMENTS

| | | | | |
|---|---|---|---|---|
| 6,015,913 | A | * | 1/2000 | Kealey .................... A23L 7/178 424/769 |
| 2009/0269439 | A1 | * | 10/2009 | Moulay ................ A23G 1/0006 426/45 |
| 2019/0357560 | A1 | * | 11/2019 | Ceballos ................ A23L 33/105 |

FOREIGN PATENT DOCUMENTS

| | | | | | |
|---|---|---|---|---|---|
| AU | 2010227053 | A1 | * | 4/2011 | ............. A01F 29/09 |
| EP | 2174557 | A1 | * | 4/2010 | ............. A23C 19/09 |
| ES | 2099676 | A1 | | 5/1997 | |
| JP | H08298959 | A | | 11/1996 | |
| JP | 09327231 | A | * | 12/1997 | |
| WO | 2013091121 | A1 | | 6/2013 | |
| WO | WO-2014042517 | A2 | * | 3/2014 | ............. C05F 11/08 |
| WO | 2020038905 | A1 | | 2/2020 | |

OTHER PUBLICATIONS

Amir et al., "Development and physical analysis of high fiber bread incorporated with cocoa (*Theobroma cacao* sp.) pod husk powder", International Food Research Journal 20(3): 1301-1305 (2013) (Year: 2013).*
Nguyen, V. et al., "Proximate Composition, Extraction, and Purification of Theobromine from Cacao Pod Husk (*Theobroma cacao* L.)", Technologies 2017, 5(2), 14, 1-10 (Year: 2017).*
Karim et al., "Phenolic composition, antioxidant, anti-wrinkles and tyrosinase inhibitory activities of cocoa pod extract", Complementary and Alternative Medicine 2014, 14:381 (Year: 2014).*
JP09327231 A (Clarivate machine translation) (Year: 1997).*
ISR-WO for PCT/EP2019/072187 (parent of present application) dated Nov. 20, 2019.
Elena Lecumberri et al; "Dietary Fibre Composition , Antioxidant Capacity and Physico-Chemical Properties of a Fibre-Rich Product from Cocoa;" Food Chemistry, vol. 104, No. 3, Jan. 1, 2007.
Martin-Cabrejas et al; "Cocoa Hull: A Potential Source of Dietary Fiber;" Journal of the Science of Food and Agriculture; vol. 66, No. 3 ;Nov. 1, 1994.
Serra Bonhevi et al; "Composition of Dietary Fibre in Cocoa Husk;" Z Lebensm Unters Forsch A; 207:105-109; Jan. 1, 1998.
H-P Dongowski et al; "Untersuchungen uber dieZusammensetzung der Polysaccharide und Ballaststoffe von Kakaoschalen sowie in deren Extraktionsriichkstiinden un Extraktstoffen;" Die Nahrung vol. 35, No. 5; Jan. 1, 1991.
R. Redgwell et al; "Dietary Fibre in Cocoa Shell: Characterization of Component Polysaccharides;" Food Chemistry vol. 81, No. 1; May 1, 2003.
Okiyama Dayane et al; "Cocoa Shell and its Compounds: Applications in the Food Industry;" Trends in Food Science and Technology vol. 63 pp. 103-112; Mar. 29, 2017.
Leyra Llanes-Herrera et al; "Empleo de Cascarilla de Cacao en Cobertura para Reposteria;" Ciencia Y Tecnologia De Alimentos, vol. 28, pp. 53-58; Apr. 1, 2018.
Rocio Campos-Vega et al; "Cocoa Pud Husk: Renewable Source of Bioactive Compounds;" Trends in Food Science and Technology vol. 81 pp. 11-12; Nov. 1, 2018.
Yi Liu et al, "Proanthocyanidin synthesis in Theobroma cacao: genes encoding anthocyanidin synthase, anthocyanidin reductase, and leucoanthocyanidin reductase", BMC Plant Biology, Biomed Central, London, GB,vol. 13, No. 1, Dec. 5, 2013.

(Continued)

*Primary Examiner* — Nikki H. Dees
*Assistant Examiner* — Andrew E Merriam
(74) *Attorney, Agent, or Firm* — Vorys, Sater, Seymour and Pease LLP

(57) ABSTRACT

The current invention relates to cacao pod husk powder, obtainable by processing cacao pod husks, comprising at least 50.0 wt % of dietary fiber, wherein at least 7.0 wt % is water soluble dietary fiber and further characterized by an ash content of not more than 15.0 wt % and a protein content of not less than 4.0 wt %. The invention also relates to a method for roasting said cacao pod husk powder. The invention also relates to the use of said cacao pod husk powder or cacao pod husk powder obtained by the disclosed method for food, cosmetics and pharmaceutical applications, wherein said food application is a confectionery application.

14 Claims, No Drawings

(56)　　　　　References Cited

OTHER PUBLICATIONS

Julio Guevara, "The Chocolate Fruit: Looking Inside a Cacao Pod | Perfect Daily Grind", Feb. 21, 2018 (Feb. 21, 2018), Retrieved from the Internet: URL:https://www.perfectdailygrind.com/2018/02/chocolate-fruit-looking-inside-cacao-pod/ [retrieved on Nov. 5, 2019].

Serra Bonhevi J et al, "Composition of Dietary Fibre in Cocoa Husk", Zeitschrift Fuer Lebensmittel-Untersuchung Und-Forschung. A,European Food Research and Technology, Springer, Heidelberg, DE,vol. 207, No. 2, Jan. 1, 1998 (Jan. 1, 1998), p. 105-109.

\* cited by examiner

CACAO POD HUSK POWDER, METHOD OF ITS PREPARATION AND ITS USE IN FOOD, PHARMACEUTICAL AND COSMETIC COMPOSITIONS

FIELD OF THE INVENTION

The present invention relates to a cacao pod husk powder, obtainable by processing cacao pod husks. In a second aspect, the present invention also relates to a method for the preparation of said cacao pod husk powder. In another aspect, the present invention relates the use of said cacao pod husk powder for food, cosmetics and pharmaceutical applications.

BACKGROUND

*Theobroma cacao* L., also known as a cacao tree, is a small tree in the family Malvaceae. A cacao tree produces about 20 usable pods a year. The cacao pods contain seeds, also known as cacao beans, surrounded by pod husks, placenta and pulp. The cacao seeds are used as cacao mass, powder or butter in various food applications. Given the value and great demand of the cacao seeds, the harvesting and processing of cacao is mainly focused on minimizing damage to the cacao seeds, while very little care and attention is paid to the pulp, placenta and pod husks surrounding the seeds. Traditionally, cacao pods are removed from the trees and are immediately cut in half using machetes. The seed bunch is saved, while the husk and stem are discarded.

Despite the importance of cacao as an agricultural export commodity, only approximately 10% of the gross weight of cacao pod is utilized for cacao mass, cacao powder and cacao butter production, while the majority of the total pod weight (cacao pulp, cacao placenta and cacao pod husks) is discarded as cacao waste.

Cacao pulp typically contains 80-90% water, 10-15% sugar, 0.4-2.0% citric acid, 1% pectin and other constituents including pentosans and polyphenols. Cacao pulp and mucilage are sometimes referred to as a "superfood" having significant health benefits.

The cacao pod husks are considered a waste product. For each ton of dried beans produced, about 16 tons (on a fresh weight basis) of cacao pod husks are left to decompose in plantations, thereby representing a serious disposal problem. The proportion of the cacao pod husk in the pod mass is in the range 68-75 wt %. Therefore, efforts have been made to convert the husk into a beneficial byproduct. The relatively high potassium content allows partial utilization of cacao pod husks as a soil fertilizer. However, rotting pods rapidly become a source of infection with microorganisms such as black pod rot. Therefore, most of the cacao pod husks are burned or buried.

Several studies disclosed the use of cacao pod husks as a nutritious animal feed.

U.S. Pat. No. 4,206,245 discloses a nutritious animal feed comprising expressed cacao fruit flesh, especially for small animals. This invention discloses the utilization of the parenchymatous part of cacao pod husks (pressed as cacao flesh juice or utilization as such) as a source of a hydrocolloid which is an emulsifying, stabilizing and suspending agent. The obtained cacao flesh juice was characterized by a high stabilizing effect, a capability of binding water, high viscosity and improved rheological properties. Disclosed applications relate to various types of food.

U.S. Pat. No. 4,331,692 discloses use of comminuted cacao fruit pods at concentrations 2-10 wt % in animal feed compositions. This disclosure aims to use of the parenchymatous tissue of the fresh or partially dried cocoa fruit, before it has become dry and/or lignified and/or has been attacked by fungi and other microorganisms.

Recently, considerable attention has been directed towards the dietary importance of dietary fiber.

U.S. Pat. No. 4,948,600 discloses a process for producing a natural cacao dietary fiber enriched material, whereby the starting material is cacao beans powder. The dietary fiber-rich cocoa material is obtained by removing starch by enzymatic degradation, and then, is extracted in the form of its degradation products, followed by washing, purifying and drying steps. Cocoa dietary fiber is predominantly insoluble dietary fiber. It was disclosed that obtained purified cocoa fiber is a suitable ingredient to enrich chocolate confectionery products and it can be incorporated into these products in a large range of quantities. The use of purified cocoa fiber can reduce the calorific content of the product.

Antioxidant compounds shown interesting health benefit properties and protective effects against various free radical-induced pathologies. However, work on the antioxidant properties of the constituents of cacao pod husks remains rather scarce. JP 2009 263 275 discloses an antioxidant composition containing a water or water-miscible organic solvent extract of cocoa pod husks, as a safe, stable, inexpensive additive with antioxidant properties for the use in cosmetics, food and drinks. Such cacao pod husk extracts are suitable for use in cosmetic preparations in relatively low concentrations (0.005-10.000 wt %).

All of the above-mentioned disclosures are limited to the utilization of only a limited part of the cacao pod husks or cacao beans, which to a limited, insufficient extent solves the excessive waste problem associated with cacao beans production.

The present invention aims to resolve at least some of the problems associated with excessive cacao pod husks waste as mentioned above. The invention thereto aims to provide an efficient utilization of cacao pod husks for multiple purposes.

SUMMARY OF THE INVENTION

The present invention and its embodiments serve to provide a solution to one or more of the above-mentioned problems referred to an excessive cacao pod husk waste.

To this end, the present invention aims for the utilization of unused cacao pod husks in order to produce cacao pod husk powder rich in dietary fiber according to the claims.

The term "cacao pod husk", as used herein, means the outer peel i.e. husk of cacao fruit, substantially devoid from cacao beans, cacao bean hulls, cacao pulp and placenta. In intact cacao pods (fruit), cacao pod husks encapsulate cacao beans, cacao bean hulls, mucilaginous cacao pulp and placenta. Typically, cacao fruit is cut open to separate the cacao pod husk from cacao bean, cacao bean hull, cacao pulp and placenta which are collected and further used in chocolate production. Cacao pod husks are typically discarded, and, as such, represent the most abundant by-product in chocolate production.

The term "water soluble fiber", as used herein, means the sum of the water soluble carbohydrate and carbohydrate components, including pentosans, gums, pectins hemicellulose degradation products etc.

Preferred characteristics of obtained cacao pod husk powder are shown in the claims.

Outer peels of cacao pod husks are utilized to produce polyphenol and flavanol rich cacao pod husk powder according to the claims. The preferred embodiment regarding cacao pod husk powder obtainable from total husks or only from the outer peel are shown in the claims.

The term "polyphenols", as used herein, means any compound being characterized by two or more phenolic groups in its structure.

The term "flavanols", as used herein, means a group of flavan derivatives, such as, but not limited to proanthocyanidins, catechins, epicatechins.

Cacao pod husks still possess many of the positive attributes or features of the cacao fruit from which it is derived, including the natural color, flavor, aroma and/or nutritional value. Cacao pod husk powder is an important raw material for utilization in the food, pharmaceutical and cosmetics industry.

The term "debacterizating", as used herein, means any procedure of applying an agent to a surface of the cacao pods in order to make said cacao pod microbiologically safe for human use. These agents include, but are not limited to chemical treatment with diluted acids, or bases, disinfecting agents or steam treatment.

In a second aspect, the present invention relates to a method for roasting of cacao pod husk powder or cacao pod husk flakes to achieve a certain taste profile, shown in the claims. The preferred embodiment is shown in the claims. The methods disclosed have further advantages such as minimal processing and minimal use of non-natural ingredients. This leads to a clean label of the compositions substantially comprising the cacao pod husk powder of the present invention. In the scope of the present invention is the powder obtained from cacao pod husks in a production process which enables the increase of dietary fiber and polyphenol content. At the same time, the obtained cacao pod husk powder has a good taste and pleasant texture and therefore suitable for use in the food industry, especially confectionery products.

In a third aspect, the present invention relates to a use according to the claims. The cacao pod husk powder obtained according to the present invention is suitable for food, cosmetics and pharmaceutical applications.

Cacao pod husk powder does not have any negative impact on sensory attributes like taste, mouthfeel and texture of the composition substantially comprising it. For said specific polyphenol composition and dietary fiber content, compositions substantially comprising the cacao pod husk powder of the present invention will exert a health promoting effect. Such compositions are characterized by lower sugar content, and therefore a clean label. The cacao pod husk powder of the present invention is enriched with dietary fiber which has the ability to bind lipids, and compositions substantially comprising the cacao pod husk powder of the invention, will be characterized by longer shelf life. The food products include but are not limited to confectionery food items such as milk and white chocolate, dark chocolate, chocolate drinks, cacao-based beverages, cakes and bakery products. Cosmetic products containing cacao pod husk powder would be characterized by a good texture and anti-oxidant effects.

Preferred embodiments of the use of cacao pod husk powder disclosed in the present invention are shown the claims.

In one embodiment, the present invention is directed to the use of the cacao pod husk powder for confectionery applications.

In another embodiment, the present invention is directed to the use of the cacao pod husk powder as a dietary fiber source in compositions substantially comprising said cacao pod husk powder.

In another embodiment, the present invention is directed to the use of the cacao pod husk powder as a sugar replacement in compositions substantially comprising said cacao pod husk powder.

In another embodiment, the present invention is directed to the use of the cacao pod husk powder as a texturizer and a stabilizing agent in compositions substantially comprising said cacao pod husk powder.

In another embodiment, the present invention is directed to the use of the cacao pod husk powder as a replacement for cacao bean powder in compositions substantially comprising said cacao pod husk powder.

In another embodiment, the present invention is directed to the use of the cacao pod husk powder for providing a bake-stability and improved capacity and appearance of compositions substantially comprising said cacao pod husk powder.

DETAILED DESCRIPTION OF THE INVENTION

The present invention concerns the solving of at least some of the problems related to cacao pod husk insufficient utilizations. The present invention discloses cacao pod husk powder enriched in dietary fiber and polyphenols, methods of producing said cocoa pod husk powder and its further use in food, pharmaceutical and cosmetic compositions.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: "A", "an", and "the" as used herein refers to both singular and plural referents unless the context clearly dictates otherwise.

"Comprise", "comprising" and "comprises" and comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, elements, members, steps known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in sequences other than those described or illustrated herein.

The expression "% by weight", "weight percent", "% wt" or "wt %", here and throughout the description unless otherwise defined, refers to the relative weight of the respective component based on the overall weight of the formulation.

Reference throughout this specification to "one embodiment" or "an embodiment" means that a particular feature, structure or characteristic described in connection with the embodiment is included in at least one embodiment of the present invention. Thus the appearance of phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the terms "cacao" and "cocoa" are both often used to refer to the same items. For example, cacao beans are often referred to as "cocoa" beans. In the present application, the term "cacao" is generally used to refer to the used materials originating from *Theobroma cacao.*

In a first aspect, the present invention relates to a cacao pod husk powder, obtainable by processing cacao pod husks, comprising at least 50.0 wt % of dietary fiber, wherein at least 7.0 wt % is water soluble dietary fiber and further characterized by an ash content of not more than 15.0 wt % and a protein content of not less than 4.0 wt %.

The first step in obtaining such powder is the pre-treatment of cacao pod husks in order to debacterize the pod surface. Cacao pods are perishable products, thus rotting pods become rapidly a source of infection with microorganisms. Therefore, it is necessary to ensure their microbiological quality prior to the production process. For such pre-treatment, according to the present invention, unopened cacao pods are treated with a preserving agent for a period of time sufficient to neutralize any harmful substances on the surface of the cacao fruit and stabilize lignification of the outer layer (peeling) of the cacao fruit. Almost any known preserving agent effective in a low concentration can be employed in this process, such as sorbic acid and salts thereof, sulfur dioxide, chlorine, chlorides, nitrates, hypochlorites, preferably those of the alkali metals, disulfites, ozone, methylformate, diphenyl, sodium ortho-phenyl phenolate, nitrogen trichloride and others. Typically, the preserving agent is employed in the form of an aqueous solution of a low but effective concentration. The concentration of the preserving agent depends, of course, upon its effectiveness and varies considerably. Optimum concentrations which do not detrimentally affect the quality of cacao fruit, can readily be determined by a person skilled in the art by routine experimentation. It is also possible to apply the preserving agent by exposing the unopened cacao pod husks to the vapors of vaporizable preserving agents, preferably diluted with air or inert gases. The treatment with the preserving agent varies also depending upon the concentration and effectiveness of the agent and may last for a period of time between about 1 hour and up to sixty days, preferably between 8 hours and 8 days although it is not limited to such a period of time. The "whole", harvested cacao fruit pod is placed directly into a bath or atmosphere containing a preservative, typically at a low but effective concentrations, for instance, between 0.2 and about 10%, and for a period of time sufficient to neutralize any toxic substances on the surface of the fruit and to stabilize lignification of the outer layer (peeling) of the fruit. To accomplish this, it generally requires between 10 min and 3 or more months, preferably 30 min to 24 h, most preferably 30 min to 3 h of exposure to the bath or atmosphere, depending upon the effectiveness and type of preservative used. Any known preservative can be employed in this step of the process, for example, sorbic acid, sorbic acid salts, sulfur dioxide, chlorides, nitrates, chlorine, hypochlorite, formaldehyde, disulfides, ozone, methylformate, diphenyl, ammonia, sodium o-phenyl phenolate, nitrogen trichloride, and others. The preferred preserving agents are sorbic acid, sulfur dioxide, chlorine, sodium chloride and hypochlorite, as many other known agents, although useful, tend to affect the taste and nutritive value of the treated cacao pods.

According to the present invention, the cacao pod husks can be used for preparation of the powder with or without the removal of the outer skin. It is demonstrated that polyphenol content is significantly higher in the outer layer of the cacao pod husk, thus unpeeled cacao pod husks will be used if a high content of polyphenols in the final cacao pod husk powder is to be achieved.

In accordance with the method of the present invention the outer skin or peeling of the harvested cacao fruit is optionally removed before the fruit is opened to remove the cacao beans and cacao bean hulls together with mucilage pulp and the placenta. Many varieties of cacao fruit and especially younger fruit pods may have their peelings removed by conventional techniques without first subjecting the said fruit pod to any special treatment. However, an average mixture of harvested fruit contains a significant percentage of certain varieties and/or older fruit which requires a pre-treatment before the peelings are removed. In case of removing the outer skin, to ease the peeling of the pods, cacao pod husks are steamed and/or treated by using alkaline solution. For this purpose the cacao fruit is treated with an alkaline bath such as an alkali metal hydroxide or, preferably, alkali metal carbonate bath at a temperature between about 50° C. and about 100° C. for a short period of time, e.g., generally from ½ minute to 30 minutes and preferably from 3 minutes to 8 minutes. Thereafter, the alkaline-treated fruit is passed through a heating zone, preferably through an infrared heated channel. The alkaline treatment at 50° C. to 100° C. for a short period of time causes the cacao fruit to swell to a certain extent. This swelling facilitates subsequent removal of the outer layers of the fruit such as the fruit peel. These outer layers are removed, for instance, by means of scrapers, knives, rollers, rubber discs, or the like means. The preferred means of this type are rubber discs rotating at a high velocity, emery rollers, toothed or corrugated rubber or plastic rollers. It will be understood that lower temperatures and longer treatment times may also be employed.

After the outer peel has been removed in this manner, i.e., using an alkaline pre-treatment, the remaining fruit is neutralized and the action of enzymes on the fruit surface is reduced or completely eliminated by treating the fruit with a suitable acid. Said acid is preferably an edible acid, such as, but not limited to citric acid, malic acid, tartaric acid, ascorbic acid, and the like. Phosphoric acid and hydrochloric acid may also be used. Treatment with sulfur dioxide is also possible and frequently of considerable advantage. The amount of acid added is such that the pH-value of the treated cacao fruit is below a pH of 7.0 and preferably at a pH between about 5.0 and 6.0.

The following step disclosed in the present invention comprises opening of the cacao fruit and removal of cacao beans and cacao bean hulls together with pulp and the placenta. The opening of the cacao pods is done by a cacao pod splitting machine, or any other suitable instrument. The cacao pod husk is shredded in any disintegrator or cutting machine to obtain cacao pod husk flakes. After the shredding of the cacao pod husks to cacao pod husk flakes of a uniform size, the product is conveyed into a batch or continuous dryer applying temperatures below 60° C., preferably below 50° C. for about 6 hours, preferably less than 3 hours. The time and temperature is dependent on the dryer capacity and performance of the dryer. The drying temperature and time is limited to avoid the deterioration of the taste of products, as well as the polymerization phenolic compounds. After drying, the moisture concentration is controlled to be below 10%, preferably below 5%. In the preferred embodiment, obtained dried cacao pod husk flakes are of a homogenous particle size distribution, with maximally 5% of particles smaller than 1 mm, maximally 5% of particles greater than 5 mm and preferably at least 50% of the flakes are within 1 mm and 5 mm, most preferably at least 90% of the flakes are within 1 mm and 5 mm.

The milling of the obtained cacao pod husk flakes is performed with a classifier mill or any other suitable milling system. Particle size requirement is dependent on the application of cacao pod husk powder. In one embodiment, wherein a coarse texture is preferred, the particle size distribution targeting D(90) of about 50 μm is required. In another embodiment of the invention, wherein very smooth textures should be obtained, a particle size distribution of D(90) of about 20 μm, and preferably D(90) of about 10 μm is required. This is done with a milling device specialized to get such fine particle size distributions.

Recently, considerable attention has been directed towards the importance of dietary fiber. Dietary fiber is generally defined as the sum of the indigestible carbohydrate and carbohydrate components of food, including cellulose, lignin, hemicelluloses, pentosans, gums and pectins. The market for dietary fiber is highly competitive. The production of high dietary fiber powders from fruit by-products and the potential preparation of those fibers with associated bioactive compounds are gaining more attention recently. While milling and enzymatic digesting have been the main steps in obtaining high dietary fiber powders from cereals; wet milling, washing, drying and dry milling are very important in producing fibers from fruit. Raw organic material from a fruit or vegetable cell source with a substantially (at least 30%), primarily (at least 50% or at least 51%), substantively (at least 75%) or an exclusively parenchymal cell wall structure can be treated with a generally mild process to form highly absorbent dietary fiber.

Treatment of raw material powder rich in fiber can be performed in order to increase its dietary fiber content and/or improve its functionality and suitability for food production. This process comprises but is not limited to the processes of heating, (boiling, cooking or roasting), adequate enzymatic treatment, soaking in acid or alkaline solution, and fermentation which changes the ratio of soluble versus insoluble fiber composition and availability of nutrients.

The cacao pod husk powder disclosed in the present invention, is characterized by at least 50.0 wt % of fiber, preferably at least 60.0 wt % of fiber, most preferably at least 65.0 wt % of fiber wherein at least 7.0 wt % is water soluble fiber, preferably at least 8.0 wt % is water soluble fiber, most preferably at least 10.0 wt % is water soluble fiber. The powder is further characterized by ash content of not more than 15.0 wt %, preferably not more than 12.5 wt %, most preferably not more than 10.0 wt % and protein content of not less than 4.0 wt %, preferably not less than 4.5 wt %, most preferably not less than 5.0 wt % of the total cacao pod husk powder. Therefore, the present invention is aiming to optimize the further process of fiber activation with the purpose of increasing the dietary fiber content. The physiochemical properties of fiber can be manipulated through treatments, such as but not limited to: chemical, enzymatic, mechanical (grinding), thermal or thermo-mechanical (extrusion, cooked-extrusion, and controlled instantaneous decompression) to improve their functionality. The cacao pod husk powder obtained by the preceding steps is subjected to a chemical treatment step which includes treatment with acid or base or selected enzymes to enable fiber degradation. In a preferred embodiment, a suspension of cacao pod husk powder, 10 to 30 wt. %, is subjected to mild soaking in an aqueous solution in water or water/ethanol mixture with the addition of sodium hydroxide in a concentration from 5 to 50 wt % (dry basis), for up to 2 h, preferably for 1 h, for carrying out the claimed process. The pH value of this suspension differs according to the type of cacao pod husk powder used. This is followed by processes of draining and washing the cacao pod husk powder until the pH is adjusted to a value between 8.0 and 9.0. Alternatively other bases can be used in this process, but bases used for adjusting the pH value must be of the proper type and must be safe for foods. These comprise, but are not limited to potassium hydroxide and calcium hydroxide. Optionally, depending on further use in a specific food product, an optional step of bleaching the raw material at a temperature between 20-100° C. in hydrogen peroxide of concentration of 1 to 20% dry basis, is employed. Additional thermal treatments, such as but not limited to boiling, cooking or roasting are performed to increase total fiber content that is not related to new synthesis, but rather to the formation of fiber-protein complexes that are resistant to heating and are qualified as dietary fiber.

These steps are followed by refining the soaked raw material with a plate refiner. This allows the reduction of the volume of wastewater, and essentially breaks up the large fibers, while replacing the use of a high concentration of sodium hydroxide.

Obtained refined raw material is dispersed and homogenizing to produce a highly refined cacao pod husk powder. In the preferred embodiment a high pressure homogenizer is used for this process to improve functionality but also to increase water binding capacity of the cacao pod husk powder and to increase the level of dietary fiber in husk powder by forming a fiber protein complex.

Applying alternative thermal and mechanical energy generating process as using the appropriate apparatus is possible, such as, but not limited to, high intensity ultrasonication, extrusion, cooked extrusion, instantaneous decompression, can change dramatically the structure of dietary fiber leading to possible new functional properties.

The suspension present at the end can be optionally subjected to either pressure filtration, using classical pressure-filtration equipment or to continuous centrifuging, using a horizontal centrifuge for example. The remaining solid portion is optionally washed to remove any clinging soluble substances. Cleaning solvents are chosen from, but not limited to water, ethanol, methanol and acetone.

In the present invention, the next step is grinding, which may affect hydration properties, in the way that the increase of surface area leads to fibers that hydrate more rapidly.

The washed, solid residue is dried. Here, the preferred method is at reduced pressure and at temperatures between 30° C. and 110° C. The dried solid residue varies in its composition, depending on the cacao pod husk powder selected as an original material and the test conditions, such as reaction time, washing processes and washing liquids used.

The step of milling the obtained cacao pod husk powder is optionally performed with a classifier mill or any other suitable milling system specialized in obtaining fine particle size distributions. It is required to mill the product to a particle size distribution targeting D(90) of about 20 μm, preferably D(90) of about 10 μm.

In order to enrich the obtained cacao pod husk powder in dietary fiber, additional extraction steps can be performed. The cacao pod husks powder of the invention is subjected to extraction processes using solvents, such as, but not limited to water, ethanol, methanol, isopropanol, hexane, ether, ethyl acetate, acetonitrile or any other suitable solvent or combination thereof. The extraction process is performed in acidic and alkaline environment. The pH value is adjusted by using acids such as hydrochloric acid, or the lake or bases such as sodium hydroxide, potassium hydroxide and the like. The extraction process of the invention is done as the single-or multi- step extraction process. In a preferred embodiment the cacao pod husk powder are processed by a method comprising the steps of a) grinding of the cacao pod powder in a solvent mixture; b) the first enzymatic treatment; c) alkaline solubilization; d) the first decantation with centrifuge; e) ultrafiltration; f) acid extraction; g) the second decantation with centrifuge; h) the second enzymatic treatment; i) ultrafiltration and extract purification; j) concentration of the fiber enriched extract; k) drying of the concentrated fiber enriched extract.

The present invention is disclosing a method characterized by a shorter processing time and lower cost, compared to the methods in the prior art aiming to prepare the dietary fiber enriched cacao material. In this method there is no need for long degradation of the cacao pod husk powder by heat-resistant α-amylase, for the purpose of removing starch, normally present in cacao beans. In the disclosed method it is possible to obtain dietary fiber enriched powder characterized by cacao aroma in a short and economical way using a mild and green process. Also, said method is aimed at utilizing cacao pod husks considered as a waste material.

The cacao pod husk powder disclosed in the present invention, comprises at least 50 wt % of fiber, preferably at least 60 wt % of fiber, most preferably at least 65 wt % of fiber, wherein at least 7 wt % is soluble dietary fiber.

It was discovered that an additional heat treatment process ensures the cacao pod husk powder characterized by a certain taste profile is obtained. This process is preferably a roasting process, and it can be performed on either the cacao pod husk flakes or the cacao pod husk powder of the invention. In the preferred embodiment, the roasting process is performed on cacao pod husk flakes. The combination of temperature and time used depends on the initial moisture content, and also if the water and/or steam is added at the beginning of roasting or at any step during roasting. The roasting can be done in any batch or continuous roasting system applying also different temperature profiles over time. The roasting conditions are determined by the impact on taste and by the demand to reduce the microbiological load. The roasting step can be considered as a debacterization step and can be done in addition to any debacterization step prior or post roasting. The roasting equipment can be any state-of-art equipment capable to adjust a certain roast profile, in a humid environment with the introduction of additional water e.g. with water injection at the beginning of roasting and a well-defined temperature-time profile. This step is typically performed in an oven equipped with a water injection mechanism, comprised of a water container with a dripping hole on the bottom facing a water-injecting hole in the upper board, or any other suitable apparatus. In the preferred embodiment, the water in the container is injected into the chamber through the dripping hole and the injecting hole. By continuously supplying water to the chamber, the oven can effectively prevent the cacao husk powder from over-dehydration and ensure the freshness and desired taste profile of the roasted cacao pod husk powder. The water addition can be from 0 to 10% depending on the target of the final taste, the roasting temperature can be up to 140° C., preferably below 110° C., most preferably between 85 and 100° C. The residence time can be up to 30 min, preferably below 20 min, most preferably below 8-10 min.

Depending on the application, it might be required to do the roasting step prior to or after the fine milling.

According to the present invention it is possible to apply an additional step of mixing the dietary fiber enriched cacao pod husk powder with raw roasted cacao pod husk powder obtained from peeled and/or unpeeled cacao pod husks in any weight ratio that allows for a suitable nutritional profile, taste and aroma of said cacao pod husk powder mixture.

The debacterization step can be any process applied in the food industry to reduce the particle size below the targeted microbiological limits. Also, this additional preservation step would ensure the microbiological quality of the powder and a practical shelf-life extender for foods and beverages. Fumigation, ozone treatment or any atmosphere containing a preservative to reduce micro contamination, is used to eliminate all pathogens like *Salmonella* spp., Enterobacteriaceae, *Staphylococcus aureus* and *Escherichia coli*. Thus, cacao pod husk powder, obtained by any of the preceding embodiments is subjected to an additional fumigation process, using the suitable method, such as, but not limited to fumigation, ozone treatment or any atmosphere containing a suitable preservative for the food industry. In order to have an ingredient suitable for food production, it is important to have an additional debacterization step. The debacterization step can be done prior to roasting (wet steam debacterization) or together with roasting in case humidity during roasting is high enough. In another embodiment, the debacterization is done after roasting.

In one embodiment, a debacterization process is performed without roasting, in order to obtain cacaco pod husk powder of a low flavor and adequate microbial quality. In order to obtain said powder of a low taste impact, the debacterization temperature is set below 120° C., preferably below 115° C. and most preferably below 105° C. The residence time in the debacterizer is not longer than 30 min, preferably less than 15 min. The amount of steam or water used in the debacterization process is dependent on the equipment, initial microbiological load and particle size distribution. Furthermore, Good agricultural practice and Good manufacturing practice are applied during the all steps of harvest and pod husk processing to ensure a low microbiological contamination prior to the processing of cacao pod husks.

Additionally, other cacao byproducts can be used to improve the taste of the cacao pod husk powder of the invention. Cacao pulp, used in its powder, juice or juice concentrate form and/or powdered placenta can be used to improve the taste and mouthfeel of the cacao pod husk powder of the invention.

The nutritional values of raw cacao pod husks and the roasted cacao pod husk powder obtained according to the present invention are shown in Table 1. It can be clearly seen that the nutrition quality in terms of major nutrients is not lost during the roasting process, while the aroma and tasting characteristics are significantly changed.

TABLE 1

The nutritional profile of raw husk powder.

| Components | Powder Obtained by the Disclosed Process Quantity (%) | Commercial Sample of Raw Cacao Husk Quantity (%) | Roasted AGG husk powder (RHP190218) Internal Analyses Quantity (%) |
|---|---|---|---|
| Ash residue | 11.0 | <0.9 | 11.7 |
| Protein (Kjedahl) | 5.7 | >5.0 | 5.9 |
| Fructose | 1.8 | 4.0 | 0.7 |
| Glucose | 0.8 | 4.0 | 0.5 |
| Lactose | <0.1 | 4.0 | <0.1 |
| Maltose | 0.2 | 4.0 | <0.1 |
| Sucrose | 1.1 | 4.0 | 1.1 |
| Total Digestible Carbohydrates | 6.8 | >6.0 | 1.1 |
| Total fat | 0.9 | — | 1.0 |
| Moisture | 3.8 | <8.0 | 0.1 |
| Total Dietary Fiber | 68.2 | >50.0 | 68.8 |
| Soluble Fiber | 10.4 | >13.0 | 10.0 |
| Insoluble Fiber | 57.8 | >45.0 | 58.8 |
| Total Polyphenol (gGAE/100 g) | 3.7 | <0.5 | 3.6 |

[a] High Molecular Weight Dietary Fiber;
[b] Refined fiber;
[c] Low Molecular Weight Dietary Fiber.

The cacao pod husk powder obtained by the disclosed processing has a higher content of fiber and improved dietary fiber profile, compared to the raw cacao husk powder. Thus, the mixture of raw cacao pod husk powder and dietary fiber enriched cacao pod husk powder in a suitable weight ratio can ensure that the cacao pod husk powder mixture is suitable for numerous applications.

The carbohydrate composition of said cacao pod husk powder and/or cacao pod husk powder mixtures is characterized by the presence of (glucurono) arabinoxylans (GlcA, Ara and Xyl), galactan (Gal), mannan (Man) and pectins (Rha, GalA). Most remarkable feature is the high amount of arabinoxylans that can be used as prebiotics (present in concentration of at least 5 wt %). The cacao pod husk powder obtained by the present invention is characterized by presence of xylooligosaccharides, galactomannan and glucomannan.

Xylooligosaccharides selectively feed beneficial bacteria such as bifidobacteria and lactobacilli within the digestive tract. A large number of clinical trials have been conducted with xylooligosaccharides, demonstrating a variety of health benefits, including improvements in blood sugars and lipids, digestive health benefits, laxation, and beneficial changes to immune markers. These health benefits have typically been observed at 1-4 g/d, which is a lower dose than required for prebiotics such as fructooligosaccharides and inulin.

Glucomannan is a dietary fiber. Orally, glucomannan is used for constipation, weight loss, diabetes, high cholesterol, overactive thyroid (hyperthyroidism), high blood pressure, and stomach conditions called dumping syndrome and functional gastrointestinal disorders. In food products, glucomannan is used as a thickener or gelling agent. Glucomannan flour and powder are used in food.

Similarly, galactomannans, as dietary fibers are often used in food products to increase the viscosity of the water phase.

Antioxidant compounds show health benefit properties and protective effects against various free radical-induced pathologies. Various studies providing evidence for the health benefit potential of cocoa bean polyphenols and other antioxidant compounds against cancer development have been largely reviewed. By contrast, work on the antioxidant properties of the constituents of cacao pod husks remains rather scarce.

In the present invention, polyphenols are detected in remarkable amounts in the cacao pod husk powder. The polyphenol content is especially high in the outer layer of the cacao pod husk, which significantly increases the total polyphenol content in the cacao pod husk powder obtained by the processing of unpeeled husks. Polyphenols from the cacao pod husks according to the invention are extracted by suitable solvent extraction techniques. As an extraction solvent any suitable polar, water miscible solvent can be used, including but not limited to methanol, ethanol and acetone, their mixtures and the like. The extracts are prepared using short extraction times and mild temperature conditions, as appropriate. Obtained extracts are typically centrifuged, filtered and the solvent is evaporated under vacuum or freeze-dried. Such polyphenol enriched extracts can be further purified; for instance, by gel permeation chromatography or by preparative High Performance Liquid Chromatography (HPLC) techniques or by a combination of such techniques. The total content of the polyphenols, can be determined spectrophotometrically, by using the FC reagent or by any other suitable method, including but not limited to HPLC. The biological activity of the extracts can be assigned to cocoa polyphenol(s) such as flavanols. These cocoa flavanols, such as procyanidins have significant anti-cancer, antitumor or antineoplastic activity, and cacao pod husk powder according to the invention is a suitable raw material for pharmaceutical compositions targeting those activities. An additional step of mixing the obtained polyphenol extract with cacao pod husk powder according to the present invention can be performed, by means of such methods as, but not limited to, spraying, soaking, or any other suitable technique in adequate weight ratios. The obtained mixture is further dried under mild conditions, to obtain cacao pod husk powder enriched in polyphenols. Such polyphenol enriched material is particularly suitable for production of functional foods and pharmaceutical compositions.

The cacao pod husk powder disclosed in the present invention, comprises at least 2.0 wt % of polyphenols. In one embodiment, cacao pod husk powder is obtained from outer peel of cacao pod husks. Said cacao pod husk powder obtained from the outer peel comprises at least 4.0 wt % of flavanols, preferably at least 5.0 wt % of flavanols and at least 10.0 wt % of polyphenols, preferably at least 12.0 wt % of polyphenols. The weight ratio of dietary fibers to polyphenols in cacao pod husk powder according to the present invention is below 30:1, preferably below 20:1.

The cacao pod husk powder according to the present invention can be used as a meat-like food product that represents a substitute for animal meat. Food products substantially comprising said powder are characterized by structure, texture, and other properties comparable to those of animal meat, and that may therefore serve as substitutes for animal meat. Food products substantially comprising said powder represent vegan and kosher alternatives to meat products.

The cacao pod husk powder of the present invention can be used in cosmetic compositions as an additive and/or active substance. The high content of polyphenols is ensuring the anti-oxidant activities of the composition substantially comprising cacao pod husk extract while the particle size of the said powder would ensure the suitable texture for the use such as, but not limited to peeling agents and body scrubs.

Finally, the present invention discloses the cacao pod husk powder which is rich in dietary fiber and, in comparison to other, previously disclosed high fiber cocoa products, is also rich in polyphenols, such as proanthocyanidins, flavanols, and clovamide. The disclosed combination of dietary fibers and polyphenols ensures the health, nutritional and/or functional benefits of the compositions substantially containing cacao pod husk powder of the present invention. The disclosed cacao pod husk powder is suitable for food application as a bulk ingredient with health benefits.

Cacao pod husk powder obtained according to the present invention can also be used as a natural cacao coloring agent after color preservation. Furthermore, it is suitable to be used as a component in various dietary and medicinal supplements. Cacao pod husk powder is suitable for use in pharmaceutical compositions with pharmacological uses, especially for health benefits related to polyphenol content, such as, but not limited to, cardio-, vaso- and hepato-protection, antimicrobial, anti-inflammatory, and anticancer activities.

The proposed processes of the present invention, disclose a stable, low cost production process of cacao pod husk powder characterized by a stable color, aroma and chemical composition which makes it suitable for the use in food and non-food applications.

The cacao pod husk powder obtained by the present invention, in both enriched and non-enriched form, can serve as a sugar replacement in said food items allowing the reduction of sugar content up to 30 wt % preferably up to 35 wt % in the finished product.

The cacao pod husk powder obtained by the present invention is a good texturizer and it can serve as a stabilizing agent in food products including but not limited to milk drinks, cold beverages, yogurts, chocolate milk, shakes, smoothies, and the like. Compositions substantially comprising cacao pod husk powder obtained by the invention have lower sugar content, which leads to a cleaner label. Fine roasting of the obtained powder and other suitable taste refinements allow for the reduction of "husk flavors" which are characteristics of the raw cacao pod husks. The cacao pod husk powder, obtained by the present invention can be utilized as a replacement of cocoa powder in food products. Thus, compositions substantially comprising cacao pod husk powder obtained by the present invention are characterized by lower amounts of cocoa powder.

The compositions substantially comprising cacao pod husk powder obtained by the invention are characterized by a better bake-stability as well as improved capacity and appearance. The high amount of dietary fiber will slow down the "aging" process of the product such as, but not limited to, bakery product, confectionery product, pastry, high starch food products, and the like.

The cacao pod husk powder enriched in dietary fiber disclosed in the present invention is suitable for incorporation at different stages of chocolate production. Those stages include, but they are not limited to:

a. adding the cacao pod husk powder in the pre-mix and processing through the refiner b. adding the cacao pod husk powder right before the conching, to avoid high cocoa butter addition to the mix.

c. blending the cacao pod husk powder directly into the chocolate

For steps a. and b. different conching temperatures are employed to allow removal of bad tasting volatiles, which results in taste improvement.

Furthermore, steps a. and b. allow reduction of the sugar content, or reduction of other ingredient concentrations, with the purposes of nutritional and/or functionality improvement of the chocolate and/or cost saving. Step b. is aimed at an improvement of conching and flavor development. All the steps allow easy mixing of cacao pod husk powder with other food ingredients.

The compositions substantially comprising cacao pod husk powder, are characterized by the high content (up to 50 wt. % of food composition) of the cacao pod husk powder, with additional constituents such as water (0-94 wt. % depending on product) and a flavor base (5 to 40 wt. % of the food composition) such as, but not limited to: tomato paste for ketchup, oils, flours, cocoa, cereals, eggs.

Listed ingredients comprising the cacao pod husk powder could be added in no particular order in a mixing vessel to obtain the composition and are to be stirred under moderate shear to produce a homogenous mixture (which are thermally processed from 90 to 98° C. between 1 to 6 min). The obtained mixture can also be milled and further homogenized from 65 to 600 bar, preferably 100-300 bar, most preferably 100-200 bar, at 15 to 95° C., preferably 70 to 95° C. Said mixture can be cooked.

Roasting of the cacao powder according to the invention may improve "husk flavor" present in the raw material. Roasting also has an impact on the color of said cacao pod husk powder. The disclosed method can have a positive impact on shelf life extension due to oil retention capacity of said powder, leading to less fat blooming and said powder will avoid pigment migration. The compositions substantially comprised of cacao pod husk powder are suitable for making hollow figures with different colored chocolates. The compositions that substantially comprise cacao pod husk powder enriched in dietary fiber are characterized by a cleaner label (by replacing the commonly used non-clean perceived ingredients in formulation). The cacao pod husk powder obtained by this invention improves the baking stability of chocolate chunks. Also, the cacao pod husk powder obtained by present invention has oil binding capacities, which makes the cacao pod husk powder a suitable ingredient for dietary compositions. Said oil binding capacity ensures the taste improvement and prolonged shelf life of the product comprising the cacao pod husk powder of the invention. Said oil binding capacity is also important from production standpoint, as less cleaning is required and no belt stickiness is observed when using compositions that substantially comprise cacao pod husk powder. This has a cost saving impact on the production process.

In compositions that substantially comprise the cacao pod husk powder of the invention, it is possible to use skimmed milk in products as a replacement without a negative impact on the finished product. This is related to the baking stability of cacao pod husk powder. Such replacement is cost saving and ensures a lower calorie count of such food products. Also, baking stability contributes to shortening the time between production and packaging, which is also a cost saving.

The cacao pod husk powder of the present invention exerts thickening properties, so it represents a good replacement for "non-clean" thickeners (e.g. carrageenan) in various compositions. Said powder has a pronounced water binding capacity, which is related to a higher stability of said compositions even without using additional thickener.

The possible applications of cacao pod husk powder obtained according to the present invention are shown in Table 2.

TABLE 2

Possible applications of the cacao pod husk powder according to the present invention, its improvements
on food functionality and taste benefit of the foods substantially comprising said powder.

| Application field | Compositions | Functionalities | Benefits |
| --- | --- | --- | --- |
| Confectionery | products with reduced sugar content and reduced cocoa bean powder content compositions suitable for all types of molding, coating, panning, and similar bake stable chunks/chips/decorations for all baking applications (cookies, muffins, croissant, tartelette) and similar palm oil free solution allergen free solution baked chocolate | oil binding agent source of dietary fiber good bulk ingredient for sugar reduction | flavor, texture, mouthfeel shelf life stability (taste, oil migration, pigment migration . . .) freeze-thaw stability cleaner label for compounds bake stability reduction of potentially harmful ingredients such as palm oil cost saving capacity improvement (packaging time reduction) |
| Bakery products (used in the dough) | integral breads all type of cookies, cakes | oil binding agent source of dietary fiber good bulk ingredient for sugar reduction | freeze-thaw stability consistency texture rheological behavior |
| Beverages | chocolate milk drinks fermented milk drinks vending machines instant powders | good bulk ingredient in chocolate milk drinks for sugar reduction thickening agent | consistency texture rheological behavior |
| Sauces | mayonnaise ketchup salad dressings | thickening agent stabilizing agent for fat binding properties | consistency texture rheological behavior |
| Functional food (health promoting benefits) | all above mentioned compositions | enrichment in dietary fiber and polyphenols | food products for promoting health low sugar and high fiber content (obesity preventing) antioxidant capacities (free radical scavenging activities) |

The invention is further described by the following non-limiting examples which further illustrate the invention, and are not intended to, nor should they be interpreted to, limit the scope of protection.

EXAMPLES

The present invention will now be further exemplified with reference to the following example(s). The present invention is in no way limited to the following examples, or preferred embodiments stated in the text. On the contrary, disclosed products, methods and applications according to the present invention may be realized in many different ways without departing from the scope of invention.

Example 1

Preparation of the Cacao Powder from Unpeeled Cacao Pods

Cacao pod husks with peel (25 kg) were debacterized and opened to remove beans, bean hulls, placenta and pulp. The remaining pod husk was shredded in a disintegrator to a uniform size. The shredded cacao pod husks were conveyed into a batch or continuous dryer applying a temperature of 45° C. for about 2.5 hours to obtain cacao pod husk flakes. The drying temperature and time are limited to avoid taste deterioration as well as phenolic compounds polymerization. Moisture concentration of the cacao pod husk flakes was 4.8%. The size of the flakes was adjusted to that of 95 % within 1 mm and 5 mm and 5% of particles below 1 mm. The following was the roasting at a temperature 85-100° C.

and during the residence time between 8-10 min. The roasting equipment was equipped with a water injector to add water at the beginning of roasting.. The water addition can be 5%. A classifier mill was used to mill the powder to a particle size distribution D(90) of about 10 μm.

Preparation of the Cacao Powder from Peeled Cacao Pods

Cacao pod husks (5 kg) were peeled by rotating discs, debacterized and opened to remove beans, bean hulls, placenta and pulp. The remaining pod husk was shredded in a disintegrator and to a uniform size. The shredded cacao pod husks were conveyed into a batch or continuous dryer applying a temperature of 45° C. for about 2.5 hours to obtain cacao pod husk flakes. The drying temperature and time are limited to avoid the taste deterioration as well as phenolic compounds polymerization.. Moisture concentration of obtained cacao pod husk flakes was 5%. The size of the flakes was adjusted to that of 95 % within 1 mm and 5 mm and 5% of particles below 1 mm. The following step was the roasting process at a temperature 85-100° C. and during the residence time between 8-10 min. The roasting equipment was equipped with the water injector at the beginning. The water addition was 5%. A classifier mill was used to mill the powder to a particle size distribution D(90) of about 10 μm.

Example 2

Preparation of Cacao Pod Husk Powder Enriched in Dietary Fiber

Obtained cacao pod husk powder from unpeeled cacao pods (15 kg) was subjected to mild soaking in an aqueous solution of sodium hydroxide (10.12 kg sodium hydroxide in 135 kg water concentrated from 7.5 wt % dry basis). The suspension was stirred vigorously and heated to 90° C. not exceeding a temperature increase of 2° C. per minute. The reaction temperature of 90° C. was maintained for 1 h. Following this digestion period the suspension was cooled to 70° C. The obtained material was further washed and drained until the pH value was set down to 8 to 9. The steps of washing and filtering were repeated until the solid content was 30 wt %. This was followed by the refining of the soaked raw material with a plate refiner (reducing the volume of wastewater, replacing the use of high concentration of NaOH) and further dispersing the refined raw material. The step of homogenizing the dispersed refined material under high pressure was performed here. Solids and liquids are separated by means of pressure filtration (3 bar variation). The solid portion was suspended in 60 kg acetone; separation was effected by using the same equipment described above. The remaining solid cake was dried under a vacuum at 40° C. The obtained, fiber enriched cacao pod husk material was grinded and milled to obtain a particle size D(90) of 10 µm. The end product was a dietary fiber enriched cacao pod husk material with the following composition: 5.49 kg of cacao pod husk powder enriched in dietary fiber, 2.43 non-degradable protein (enzymatically) and 0.81 kg ash.

Example 3

Food Compositions Substantially Comprising Cacao Pod Husk Powder Enriched in Dietary Fiber

Preparation of Cacao Pod Husk Powder Enriched in Dietary Fiber

As an example, two embodiments were made utilizing cacao pod husk powder obtained from unpeeled and peeled cacao pods and processed in the same way as described in Example 1. Cacao pod husk powder obtained from unpeeled cacao pods was used to produce dark chocolate as described below, while cacao pod powder obtained from peeled cacao pods was used to produce chocolate beverage.

Dark Chocolate

Mixture of 9 kg cacao pod husk powder enriched in dietary fiber produced according to Example 2 and 2 kg of unpeeled cacao pod husk powder produced by Example 1, with 9.0 kg cocoa liquor, 20.0 kg cocoa butter, 38.3 kg white sugar and 0.15 kg lecithin is produced. All the listed ingredients were added to a mixing vessel and were stirred under moderate shear to produce a homogenous mixture at a temperature 45-50° C. between 1 to 6 min.

A paste was formed and subsequently refined by a three or a five roll refiner to obtain refiner flakes. The refiner flakes were transferred to a conching apparatus and then treated like customary chocolate. Additional portion of cacao pod husk powder enriched in dietary fiber disclosed in the present invention was added to the chocolate mass right before the conching, to avoid high cocoa butter addition to the mix. Complete liquefaction of the dietary fiber-rich dark chocolate is achieved by adding 2.0 kg of dry cacao pod husks powder enriched in dietary fiber produced according to invention, 2.0 kg of cocoa butter and 2.0 kg lecithin during conching. The conching temperature was controlled at 80° C. to allow the removal of bad tasting volatiles. The obtained mixture was further homogenized, at 15 to 95° C.

The resulting liquid, dietary fiber enriched chocolate was tempered and molded in the devices for normal chocolate.

The obtained dietary fiber-rich dark chocolate was very pleasant in taste and quality. Its color and taste were very similar to that of dark chocolate prepared by a regular process.

Furthermore, adding the cacao pod husk powder enriched in dietary fiber allows for the reduction of sugar content, or the reduction of other ingredients concentrations, with the purpose of nutritional and/or functionality improvement of the chocolate and cost saving. The disclosed process was shown to allow improvement of conching and flavor development. All the steps allow the combination of cacao pod husk powder with other functional food ingredients.

Chocolate Beverage 4 kg of the cacao pod husk powder enriched in dietary fiber (disclosed in Example 2) and 1 kg of the chocolate husk powder obtained from the peeled husks (disclosed in Example 1), obtained in accordance with the invention, were crushed and mixed with 10 kg of cocoa powder containing lecithin (10 to 12 wt. % fat) and 20 kg of fine sugar.

The dry mixture is then agglomerated, whereby the powder was sprayed in a steam bed, in accordance with the standard conditions of agglomeration. The end product is a dietary fiber-rich instant cocoa beverage which tasted good and only differed from the normal instant cocoa beverage in its somewhat darker color.

Example 4

Impact of the Roasting Length on Powder Taste

Raw or roasted cacao pod husk powder was incorporated in different matrices and subjected to tasting by a panel of participants (15). The results are summarized in the Table 3.

TABLE 3

| Effect of roasting length on taste of cacao pod husk powder. | | |
|---|---|---|
| Unroasted | Roasting 15 min | Roasting 30 min |
| Biscuit | | |
| Odor / | / | / |
| Taste No cacao taste (3), spicy (4), green (4), sweet (3), flat aftertaste (1) | Slight cacao taste (8), roasted (2), overcooked (3), driest and hardest (2) | Green taste (1), dusty (1), hay/straw (1), roasted note (10), overcooked (3) |
| Hot milk drink | | |
| Odor Moka (13), green (2) | Similar to unroasted sample (6), roasted notes (5), caramel (4) | Similar to unroasted/Roasted for 15 min (10), roasted notes (5) |
| Taste Coffee (2), caramel (2), matcha tea (2), strong aftertaste (2), milky (2), sour (2), sweet (2), fermented (1) | Green (2), sweet/caramel (5), Milky (2), sour (1), mouldy (1), less sweet (1), more coffee-like (3) | Roasted coffee (5), roasted cereals (4), green taste (1), very similar to the taste of sample roasted for 15 min (3), more pleasant (1), milky (1) |

TABLE 3-continued

| Effect of roasting length on taste of cacao pod husk powder. | | |
| --- | --- | --- |
| Unroasted | Roasting 15 min | Roasting 30 min |

Hot water drink

| | Unroasted | Roasting 15 min | Roasting 30 min |
| --- | --- | --- | --- |
| Odor | Vegetal/green (3), fresh (3), sour (2), fermented (2), spicy (2), coffee (3) | Similar to unroasted sample | Similar to unroasted/Roasted for 15 min (15) |
| Taste | Short taste (2), green (3), matcha tea (2), caroube (2), liquorice (2), chicoree (2), cardboard (2) | Dusty (2), sour (3), fermented (3), moldy (1), coffee (5), beer (1) | Less tasty (3), dusty (2), like the others (6), roasted cereals (3), roasted buckwheat (1) |

Example 5

Impact of the Peel Removal on Taste

For the purpose of comparing the tastes, 4 powders were prepared according to the invention:

Sample 1: Roasted unpeeled cacao pod husk flakes obtained by the present invention were characterized by a bitter, roasted taste.

Sample 2: Roasted inner husk (peeled) flakes obtained by the present invention were characterized by a sweet, chocolate like and woody taste.

Sample 3: Raw unpeeled cacao pod husk flakes obtained by the present invention were characterized by a sour, woody and green taste.

Sample 4: Raw inner husk (peeled) flakes obtained by the present invention were characterized by a neutral taste with some green/vegetal notes.

After tasting by panelists, it was unanimity concluded that powder 2 was of the best taste. It was concluded that powder obtained from peeled cacao pod husks has a more neutral, preferred taste, which is suitable characteristics of bulking ingredients.

Example 6

Chocolate Tablets Containing Cacao Pod Husk Powder

Chocolate tablets were made with a mixture containing 750 g of the cacao pod husk powder obtained from the peeled cacao pod husks (disclosed in Example 1):

Sample 1—"Chocolate tablets made with 5 wt % of cacao pod husk powder were characterized by a sour, sweet, cocoa taste.

Sample 2—reference (no dietary fiber enriched cacao pod husk powder) was characterized by a sweet, cocoa taste.

Sample 3—Chocolate tablets made with 30 wt % of cacao pod husk powder were characterized by a strong, rich, roasted cocoa taste.

Sample 4—Chocolate tablets made with 15 wt % of cacao pod husk powder were characterized by a strong cocoa notes with some sweetness.

There was no overall preferences between the four chocolates.

To conclude, chocolate tablets characterized by 30 wt % of cacao pod husk powder had an very strong and intense cacao taste, implying that said concentration is suitable for a "intense cacao" version of chocolate tablets. However, chocolate tablets containing 5 wt % and 15 wt % of cacao pod husk powder had a very mild, somewhat sweet cacao taste, and said powder in this concentrations could be used as a sugar replacement.

Example 7

Bake Stability Improvement of Bakery Products

Bake stability improvement was tested by using 1 kg dietary fiber enriched cacao pod husk powder (disclosed in Example 2) in a bakery product.

In this example, muffins containing "UK best seller" dark chunks instead of dietary fiber enriched cacao pod husk powder chunks, were made as a reference group. The reference group was compared to muffins containing chocolate chunks characterized by different concentrations of cacao pod husk powder (11.3 wt. %, 5.6 wt. % and 2.8 wt. %, respectfully). After baking, the muffin samples were inspected for tailing. The difference observed was significant, the reference group were more prone to tailing than the muffins containing the chunks with cacao pod husk powder of the invention. The main difference was on shape retention: the chunks of the reference group were melted at the surface causing tail formation, while the chunks of the samples containing cacao pod husk powder of the invention kept their shape. Better shape retention was observed when a higher content of cacao pod husk powder was used. The results were conclusive and showed that right after baking, the chunks of the reference group were melted (tailing), and while the chunks made with cacao pod husk powder were not. It was also observed that the plate was oily under the reference group, but not under the muffins with the chunks containing the cacao pod husk powder. After 1.5 h, the chunks with cacao husk powder had a good shape, semi hard texture and good taste. The reference group showed some chocolate chunks stuck to the plate, but no chocolate chunks prepared with dietary fiber enriched cacao pod husk powder stuck to the plate. This "no sticking" effect made the cleaning of the belt easier and, thus, the production process was more efficient and cheaper.

Example 8

Cacao Pod Husk Powder Used as an Additive in Ketchup

Cacao pod husk powder enriched in dietary fiber (200 g) was added to 160 g of tomato paste, including 20 g of salt, 4 g of oregano, 40 g of invert sugar, 40 g of soybean protein, and spices (thyme and black pepper). The ingredients are thoroughly mixed with each other for about 10 minutes and the mixture is homogenized. The obtained mixture was tasted by 15 panelists and compared to the ketchup containing all ingredients in adjusted quantities without the cacao pod husk powder. The panelists concluded that the ketchup mixture comprising cacao pod husk powder has no taste difference as compared to the control sample. The obtained ketchup product is enriched in dietary fiber and represents a healthier alternative to a regular ketchup. Cacao pod husk powder of the invention can be used as a cheap and available fiber source in sauces like ketchup.

Example 9

Low Calorie Mayonnaise

Cacao pod husk powder enriched in dietary fiber (200 g) was added to 200 g of mayonnaise. The constituents are mixed with each other and thoroughly homogenized. The obtained mixture was tasted by 15 panelists and compared to the mayonnaise containing all ingredients in adjusted quantities without the cacao pod husk powder. The panelists concluded that the mayonnaise comprising the cacao pod husk powder had no taste difference as compared to the control product. The product can be used as a bread spread with a lower calorie value and higher dietary fiber content than mayonnaise, thus it represents a healthier alternative to mayonnaise.

Example 10

Low Calorie Salad Dressing

Amount of 25 g of olive oil, 250 g of the cacao pod husk powder enriched in dietary fiber, 10 g of salt, 100 g of vinegar, 5 g of chopped onions, 5 g of garlic powder, 1 g of potassium sorbate, 1 g of sodium benzoate, and 100 g of water were thoroughly mixed in a string wire mixer. The mixture was homogenized in a homogenizer or a colloid mill.

Obtained mixture was tasted by 15 panelists and compared to the salad dressing that contained all ingredients in adjusted quantities without the cacao pod husk powder. The panelists concluded that the mixture comprising cacao pod husk powder had no taste difference as compared to the control product. In a similar manner, any other type of dressing may be produced with more or less oil or vinegar and with other components as required. The obtained sauce is rich in dietary fiber, thus said powder represents suitable and low cost fiber source in such food products.

Example 11

Exfoliating Cacao Pod Husk Powder Scrub Suitable for Use in Cosmetic Compositions.

Cacao pod husk powder obtained by the present invention (unpeeled husks, disclosed in Example 1) can be used as an exfoliating and peeling ingredient in body and facial scrub formulations. The powder of the cocoa pod was mixed in the late stages of the body and/or facial peeling scrub formulation in a concentration of 50 wt % without interference with another formulation constituents. Obtained body and/or facial peeling scrub according to the present invention ensures exfoliating activities, removes dirt and exerts no irritation on the treated skin.

Example 12

Extraction of Polyphenols from Cacao Pod Husk Powder

Cacao pod husk powder, obtained by the present invention can be used as a raw material for polyphenol extraction. An amount of 10 g of raw cacao pod husk powder from unpeeled husks (disclosed n Example 1) was extracted using 100 ml of 70% aqueous acetone for 30 min at suitable the shaker, protected from light. The slurry was centrifuged for 15 min at 4° C. at 3000 xg and the supernatant was filtered through a suitable filter. The filtrate was subjected to distillation under a partial vacuum and the product of distillation aqueous phase frozen in liquid nitrogen. The yields of total polyphenols is 3.6 wt %, as determined spectrophotometrically, using the Folin-Ciocalteu reagent.

Example 13: Cacao Pod Husk Powder as a Sugar and Flour Replacement in the Biscuit In order to improve a nutritional profile of a biscuit, the cacao pod husk powder obtained in Example 1 obtainable from unpeeled cacao pods was used as a sugar or flour replacement in a biscuit recipe.

Ingredients of an initial biscuit used for comparison, and biscuits with reduced sugar and/or flour are given below in Tables 4-11.

TABLE 4

| Original (initial) recipe. | | |
|---|---|---|
| Ingredients | % | g |
| Flour | 46.40% | 185.6 |
| Icing Sugar | 24.10% | 96.4 |
| Colza oil | 12.10% | 48.4 |
| Water | 12.10% | 48.4 |
| Cocoa Powder | 5.00% | 20 |
| Salt | 0.00% | 0 |
| Baking Powder | 0.30% | 1.2 |
| Total | 100.00% | 400 |

TABLE 5

| Recipe with addition of 10.0 wt % of cocoa pod husk powder CPHP. The extra amount of water (10 g water/200 g of dough) is added to obtain homogenous dough. | | |
|---|---|---|
| Ingredients | % Percentage | g 200 |
| Flour | 41.76% | 83.52 |
| Icing sugar | 24.10% | 48.2 |
| Rapeseed oil | 12.10% | 24.2 |
| Water | 12.10% | 24.2 |
| CPHP | 5.00% | 10 |
| Baking powder | 0.30% | 0.6 |
| Fiber | 4.64% | 9.28 |
| Total | 100.00% | 200 |

TABLE 6

| Recipe with reduction of 10.0 wt % of flour and addition of 10.0 wt % of cocoa pod husk powder CPHP. The extra amount of water (10 g water/200 g of dough) is added to obtain homogenous dough. | | |
|---|---|---|
| Ingredients | % Percentage | g 200 |
| Flour | 41.76% | 83.52 |
| Icing sugar | 24.10% | 48.2 |
| Rapeseed oil | 12.10% | 24.2 |
| Water | 12.10% | 24.2 |
| CPHP | 5.00% | 10 |
| Baking powder | 0.30% | 0.6 |
| Fiber | 4.64% | 9.28 |
| Total | 100.00% | 200 |

TABLE 7

Recipe with reduction of 20.0 wt % of flour and addition of 10.0 wt % of cocoa pod husk powder CPHP. The extra amount of water (12.5 g water/200 g of dough) is added to obtain homogenous dough.

| Ingredients | % Percentage | g 200 |
| --- | --- | --- |
| Flour | 38.05% | 76.1 |
| Icing sugar | 24.10% | 48.2 |
| Rapeseed oil | 12.10% | 24.2 |
| Water | 12.10% | 24.2 |
| CPHP | 5.00% | 10 |
| Baking powder | 0.30% | 0.6 |
| Fiber | 8.35% | 16.7 |
| Total | 100.00% | 200 |

TABLE 8

Recipe with reduction of 30.0 wt % of flour and addition of 10.0 wt % of cocoa pod husk powder CPHP. The extra amount of water (18.5 g water/200 g of dough) is added to obtain homogenous dough.

| Ingredients | % Percentage | g 200 |
| --- | --- | --- |
| Flour | 33.88% | 67.75 |
| Icing sugar | 24.10% | 48.2 |
| Rapeseed oil | 12.10% | 24.2 |
| Water | 12.10% | 24.2 |
| CPHP | 5.00% | 10 |
| Baking powder | 0.30% | 0.6 |
| Fiber | 12.53% | 25.05 |
| Total | 100.00% | 200 |

TABLE 9

Recipe with reduction of 10.0 wt % of sugar and addition of 10.0 wt % of cocoa pod husk powder CPHP. The extra amount of water (10.0 g water/200 g of dough) is added to obtain homogenous dough.

| Ingredients | % Percentage | g 200 |
| --- | --- | --- |
| Flour | 46.40% | 92.8 |
| Icing sugar | 21.69% | 43.38 |
| Rapeseed oil | 12.10% | 24.2 |
| Water | 12.10% | 24.2 |
| CPHP | 5.00% | 10 |
| Baking powder | 0.30% | 0.6 |
| Fiber | 2.41% | 4.82 |
| Total | 100.00% | 200 |

TABLE 10

Recipe with reduction of 20.0 wt % of sugar and addition of 10.0 wt % of cocoa pod husk powder CPHP. The extra amount of water (18.5 g water/200 g of dough) is added to obtain homogenous dough.

| Ingredients | % Percentage | g 200 |
| --- | --- | --- |
| Flour | 46.40% | 92.8 |
| Icing sugar | 19.28% | 38.56 |
| Rapeseed oil | 12.10% | 24.2 |
| Water | 12.10% | 24.2 |
| CPHP | 5.00% | 10 |

TABLE 10-continued

Recipe with reduction of 20.0 wt % of sugar and addition of 10.0 wt % of cocoa pod husk powder CPHP. The extra amount of water (18.5 g water/200 g of dough) is added to obtain homogenous dough.

| Ingredients | % Percentage | g 200 |
| --- | --- | --- |
| Baking powder | 0.30% | 0.6 |
| Fiber | 4.82% | 9.64 |
| Total | 100.00% | 200 |

TABLE 11

Recipe with reduction of 30.0 wt % of sugar and addition of 10.0 wt % of cocoa pod husk powder CPHP. The extra amount of water (21.5 g water/200 g of dough) is added to obtain homogenous dough.

| Ingredients | % Percentage | g 200 |
| --- | --- | --- |
| Flour | 46.40% | 92.8 |
| Icing sugar | 16.87% | 33.74 |
| Rapeseed oil | 12.10% | 24.2 |
| Water | 12.10% | 24.2 |
| CPHP | 5.00% | 10 |
| Baking powder | 0.30% | 0.6 |
| Fiber | 7.23% | 14.46 |
| Total | 100.00% | 200 |

Conclusion: All the samples were of acceptable taste qualities. It should be noted that the samples with 30% of reduction of sugar and flour had somewhat chewy texture, as the amount of added water was high. The preferred sample was with 10.0% of sugar reduction.

It is believed that the present invention is not limited to the embodiments described above and that some modifications or changes may be added to the examples described without revaluing the appended claims.

The invention claimed is:

1. A produced powder obtained by:

providing one or more cacao pod husks, wherein cacao pod husks comprise beans, bean hulls, placenta, and pulp, and discarding said beans, bean hulls, placenta, and pulp;

shredding said cacao pod husks;

drying said shredded cacao pod husks, wherein the drying is performed at a temperature of 45 to about 60° C., during a residence time of less than 3 hours;

milling said shredded cacao pod husks to form a powder derived from cacao pod husks;

subjecting said powder to extraction processes using solvents chosen from the group consisting of water, ethanol, methanol, isopropanol, hexane, ether, ethyl acetate, acetonitrile, or combinations thereof; and roasting said powder, wherein said roasting is performed at between 80 and 90° C., during a residence time of between 8-10 min, and in a humid environment with the introduction of additional liquid water, and wherein said roasting is performed in an oven comprising a water- injection mechanism, the water-injection mechanism comprising a water container having a dripping hole, whereby the additional liquid water is continuously supplied into the oven during roasting, to produce a produced powder comprising:

at least 60.0 wt % of dietary fiber, wherein at least 7.0 wt % is water soluble dietary fiber, based on the total weight of said produced powder, and further characterized by an ash content of not more than 15.0 wt % and a protein content of not less than 4.0 wt %, based on the total weight of said produced powder, wherein said produced powder has a weight ratio of dietary fibers to polyphenols of 30:1 to 20:1.

2. The produced powder according to claim 1, comprising at least 2.0 wt % polyphenols, based on the total weight of said produced powder.

3. The produced powder according to claim 1, having a particle size distribution D(90) of about 50 micron or less.

4. The produced powder according to claim 1, having a fine, smooth texture and particle size distribution D(90) of about 20 micron.

5. A method comprising:

providing one or more cacao pod husks, wherein cacao pod husks comprise beans, bean hulls, placenta, and pulp, and discarding said beans, bean hulls, placenta, and pulp;

shredding said cacao pod husks;

drying said shredded cacao pod husks, wherein the drying is performed at a temperature of 45 to about 60° C., during a residence time of less than 3 hours;

milling said shredded cacao pod husks to form a powder derived from cacao pod husks;

subjecting said powder to extraction processes using solvents chosen from the group consisting of water, ethanol, methanol, isopropanol, hexane, ether, ethyl acetate, acetonitrile, or combinations thereof, and roasting said powder, wherein said roasting is performed at between 80 and 90° C., during a residence time of between 8-10 mins, and in a humid environment with the introduction of additional liquid water, wherein said roasting is performed in an oven comprising a water-injection mechanism, the water-injection mechanism comprising a water container having a dripping hole, whereby the additional liquid water is continuously supplied into the oven during roasting, to produce a produced powder comprising;

at least 60.0 wt % of dietary fiber, wherein at least 7.0 wt % is water soluble dietary fiber and further characterized by an ash content of not more than 15.0 wt % and a protein content of not less than 4.0 wt %, based on the total weight of said produced powder.

6. The method according to claim 5, wherein said cacao pod husks comprise peeled cacao pod husks.

7. The method according to claim 6, further comprising adding water after said roasting step to produce a mixture comprising water and the produced powder; and after said water addition step, combining said mixture comprising water and the produced powder with a composition application that is a food.

8. The method according to claim 7, wherein said food application is a confectionery application.

9. The method according to claim 7, wherein said produced powder is a dietary fiber source in said application and said application comprises up to 50 wt % produced powder based on the weight of said application.

10. The method according to claim 7, wherein said produced powder is a sugar replacement in said application and said application comprises up to 50 wt % produced powder based on the weight of said application.

11. The method according to claim 7, wherein said produced powder is used as a texturizer and a stabilizing agent in said application and said application comprises up to 50 wt % produced powder based on the weight of said application.

12. The method according to claim 7, wherein said produced powder is used as a replacement for cocoa powder in said application and said application comprises up to 50 wt % produced powder based on the weight of said application.

13. The method according to claim 7 wherein said produced powder provides a bake stability and wherein said application comprises up to 50 wt % produced powder based on the weight of said application.

14. The produced powder according to claim 1, wherein at least some protein, but not all protein, comprises a fiber-protein complex.

* * * * *